United States Patent [19]
Seki et al.

[11] Patent Number: 5,159,558
[45] Date of Patent: Oct. 27, 1992

[54] PART PROGRAM EXECUTION METHOD FOR CONVERTING A PART PROGRAM INTO NUMERICAL CONTROL DATA

[75] Inventors: Masaki Seki; Takashi Takegahara, both of Tokyo; Akira Kajitani, Yamanashi, all of Japan

[73] Assignee: Fanuc Ltd, Japan

[21] Appl. No.: 476,486

[22] PCT Filed: Oct. 23, 1989

[86] PCT No.: PCT/JP89/01083
§ 371 Date: Jun. 7, 1990
§ 102(e) Date: Jun. 7, 1990

[87] PCT Pub. No.: WO90/05327
PCT Pub. Date: May 19, 1990

[30] Foreign Application Priority Data
Oct. 31, 1988 [JP] Japan .................. 63-275914

[51] Int. Cl.$^5$ .................. G05B 19/42; G05B 15/46
[52] U.S. Cl. .................. 364/474.27; 364/192; 364/474.26
[58] Field of Search .................. 364/188-192, 364/474.22, 474.26, 474.27, 193, 474.23, 474.25, 474.24; 371/19; 395/157, 922, 917

[56] References Cited
U.S. PATENT DOCUMENTS

| | | | |
|---|---|---|---|
| 4,513,366 | 7/1991 | Munekata et al. | 364/192 |
| 4,794,514 | 12/1988 | Hidenki et al. | 364/192 |
| 4,890,234 | 12/1989 | Tanaka et al. | 364/192 |
| 4,891,763 | 1/1990 | Kuriyama | 364/192 |

*Primary Examiner*—Jerry Smith
*Assistant Examiner*—Jim Trammell
*Attorney, Agent, or Firm*—Staas & Halsey

[57] ABSTRACT

Disclosed is a part program execution method for converting a part program, which has been created in an automatic programming language, into NC data in a format capable of being executed by an NC unit. When an error present in a part program is detected during execution of the part program (PPM), an inquiry (M2) inquiring as to whether the part program is to be corrected is displayed on a display screen (CRT) together with an error message (M1). If implementation of a correction is designated, a correction screen is displayed and the part program is re-executed from the beginning thereof in response to designation of the end of the correction.

1 Claim, 6 Drawing Sheets

FIG. 4

```
* * PART PROGRAM EDITING * *

001   PART, @ REIDAI
    002   MCHN, MILL, ABS
     . . . .
    045     P1 = x_1 , y_1
    046     P2 = x_2 , y_2
    047     P3 = x_3 , y_3
    048     S1 = P2, P3
    049     C1 = x_4 , y_4 , r_1
    050     P5 = x_5 , y_5
    051     S2 = P5, C1, B
     . . . .
    080   CUTTER,   10
    081 @S0800
     . . . .
     . . . .
```

CRT

```
** PART PROGRAM EDITING **
    045    P1 = x₁ , y₁
    046    P2 = x₂ , y₂
    047    P3 = x₃ , y₃
    048    S1 = P2, P3
    049    C1 = x₄ , y₄ , r₁
    050    P5 = x₅ , y₅
    051    S2 = P5, C1, B
    . . . .
    080
    081
```

FIGURE DEFINITION ERROR :
ERROR NO. 164

```
        001   PART, @ REIDAI           ----(1)
        002   MCHN,MILL,ABS            ----(2)
               . . .
        045      P1 = x1, y1
        046      P2 = x2, y2
PPM     047      P3 = x3, y3
        048      S1 = P2, P3           ----(3)
        049      C1 = x4, y4, r1       ----(4)
        050      P5 = x5, y5
        051      S2 = P5, C1, B        ----(5)
               . . .
        080   CUTTER, 10               ----(6)
        081   @S0800                   ----(7)
        082   TLLFT                    ----(8)
        083   FROM, P1                 ----(9)
        084   RPD, TO, S1, P2          ----(10)
        085   FCOD, 500                ----(11)
        086   S1
        087   C1
        088   S2
               . . .
        098   FINI
        099   PEND
```

PART PROGRAM EXECUTION METHOD FOR CONVERTING A PART PROGRAM INTO NUMERICAL CONTROL DATA

FIELD OF THE INVENTION

This invention relates to a method of executing a part program and, more particularly, to a part program execution method for converting a part program, which has been created in an automatic programming language, into numerical control ("NC") data in a format capable of being executed by an NC unit.

DESCRIPTION OF THE RELATED ART

In automatic programming for creating NC data using an automatic programming language such as APT (automatically programmed tools) or FAPT, (a) a part program based on the automatic programming language is created by defining points, straight lines and circular arcs using simple symbols (this is referred to as "figure definition"), and defining a profile of a part using these defined points, straight lines and circular arcs (referred to as "motion statement definition"), and (b) the part program based on the automatic programming language is subsequently converted into NC data, which comprises NC data (EIA codes or ISO codes) in a format capable of being executed by an NC unit.

FIG. 7 shows a part program PPM created in an automatic programming language. In FIG. 7, the portion from line "045" to line "088" is a part program for moving a tool along a figure which comprises straight lines S1, S2 and a circular arc C1, starting from a point P1 (see FIG. 6). It is arranged to define a figure composed of points P1, P2, P3, P5, straight lines S1, S2 and circular arc C1, and to define subsequently a motion statement along the figure. Line numbers 045–051 are figure definition statements, line number 083–084 and 086–088 are motion definition statements, and line numbers 080–082, 085 are machining auxiliary statements.

After the part program is created, an automatic programming unit responds to selection of a part program execution function by effecting a conversion into NC data in an execution format based on EIA or ISO codes while referring automatically to an NC data output table.

In FIG. 7, (1) designates the start of the part program, and "REIDAI" is a header.

(2) indicates the type of NC machine. "MILL" is used in case of milling and "TURN" in case of turning. "ABS" indicates an absolute command ("INCR" is used in case of an incremental command).

(3) signifies or indicates a straight line passing through points P2, P3.

(4) signifies a circular arc of center $(x_4, y_4)$ and radius $r_1$.

Of the two tangent lines passing through the point P5 and contacting the circular arc C1, (5) signifies the lower tangent line (straight line). The alphabetic character B is a modifier meaning "below". In the case of the tangent line on the upper side, a modifier A meaning "above" is used instead of the modifier B.

(6) indicates a tool command which command a tool having a tool diameter of 10 mm.

(7) indicates a command for the rotational velocity of a spindle.

(8) indicates a command which offsets the tool to the left side of the direction of travel (the command would be TLRGT to offset the tool to the right side of the direction of travel.

(9) indicates a coordinate system setting command indicating that the starting point is P1;

(10) indicates a command for positioning in the direction of the straight line S1 and for positioning a cutter in such a manner that the cutter will contact the straight line at the point P2.

(11) indicates a velocity command which indicates that the feed velocity is 500 mm/min.

When a grammatical error or an error due to a logical contradiction (a figure which cannot be defined) in terms of using a statement appears in the part program when the completed part program is being converted into NC data (which is referred to as execution of the part program), an error message corresponding to the contents of the error is output and execution processing is halted while in progress. In order to correct the part program, the operator manually returns the display from a part program execution screen to an initial screen for activity selection, selects a part program correction activity (editing activity) and calls the part program using the initial screen, finds the error location in the part program by employing the error message, and corrects the part program. After the correction, the operator again manually returns the display from the correction screen to the initial screen, selects the part program execution activity, calls the corrected part program and re-executes processing for conversion to NC data.

Thus, the conventional part program execution method is such that if an error occurs, the entire operation for changing over the display must be performed manually in the following manner until the part program is corrected and re-executed: execution screen→initial screen→editing screen→initial screen→execution screen. The operation required for going back and forth between these screens is very troublesome, and an exorbitant amount of time is needed for changing over screens.

SUMMARY OF THE INVENTION

Accordingly, an object of the present invention is to provide a part program execution method so adapted that when an error occurs in a part program, the operation required for going back and forth between screens until the part program is re executed can be performed simply and without taking too much time.

In accordance with the present invention, the foregoing object is attained by displaying a prompt, which inquires as to whether a part program is to be corrected on a part program execution screen when an error is detected during execution of the part program, automatically displaying a part program correction screen if implementation of a correction has been designated, returning to the part program execution screen in response to designation of the end of the correction, and re-executing the corrected part program from the beginning thereof.

BRIEF DESCRIPTION OF THE DRAWINGS

FIG. 4 shows a correction screen on which a list of a part program is displayed;

FIGS. 6 and 7 are views for describing examples of the prior art, in which FIG. 6 is a view for describing a tool path, and FIG. 7 is an example of a part program.

DESCRIPTION OF THE PREFERRED EMBODIMENT

Figure 1:
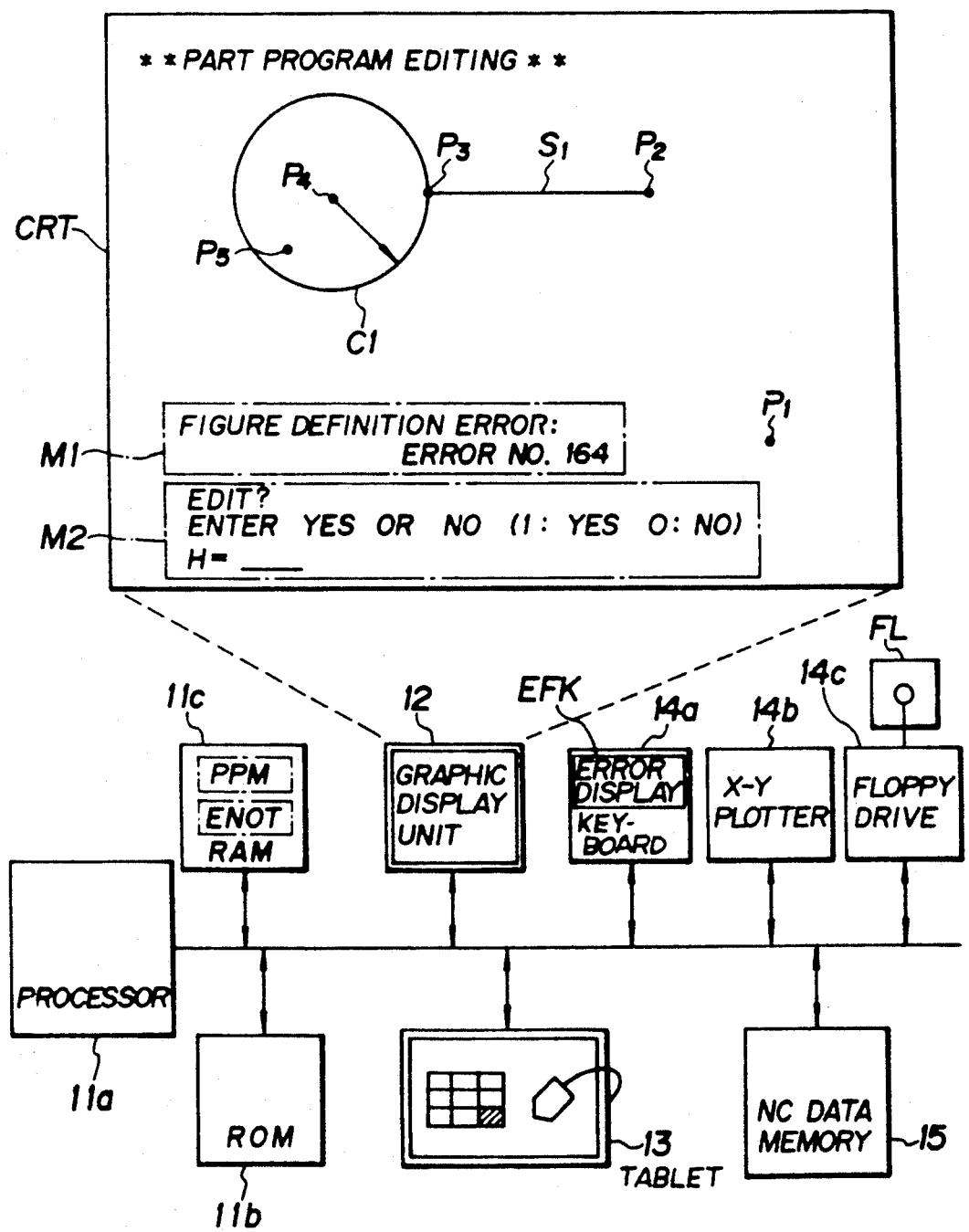
FIG. 1 is a block diagram of an apparatus for practicing the present invention.

FIG. 1 is a block diagram of an automatic programming apparatus for practicing the present invention.

Shown are a processor 11a which performs automatic programming processing, a ROM 11b in which loading programs and the like have been stored, a RAM 11c for storing a system program read in from a floppy FL, as well as various parameters and the results of processing, a graphic display unit (CRT) 12, a tablet device 13, a keyboard 14a, an X-Y plotter 14b, a floppy drive 14c, and an NC data memory 15 for storing execution-format NC data that is eventually created. It should be noted that a part program execution screen which prevails at the time an error occurs is being displayed as an example on the CRT of the graphic display unit 12, in which M1 represents an error message indicating the type of an error, and M2 represents a prompt inquiring as to whether editing (a correction) is to be performed.

Figure 2:
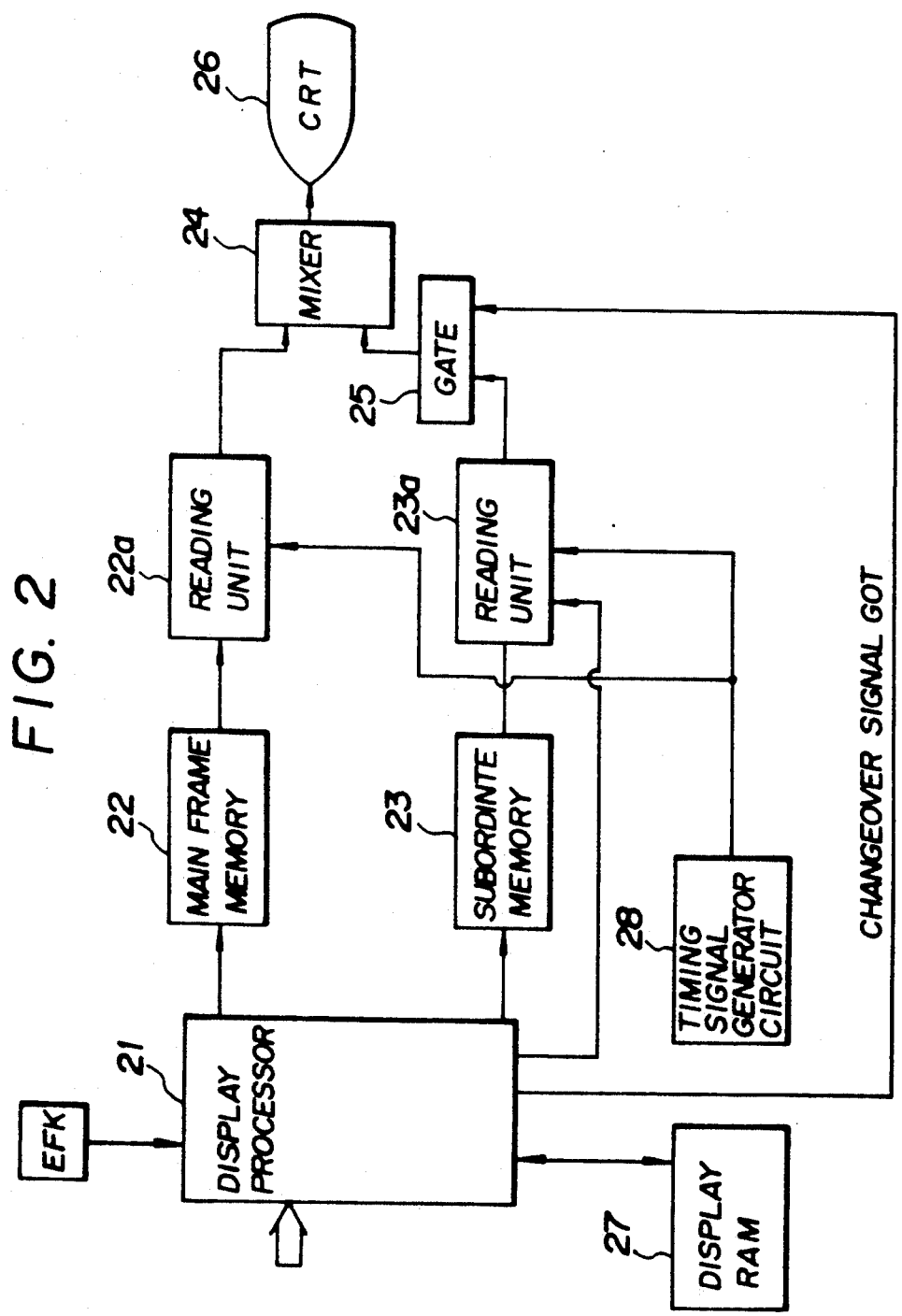
FIG. 2 is a block diagram of a graphic display unit according to the invention.

FIG. 2 is a block diagram of the graphic display unit 12.

Numeral 21 denotes a display processor which generates an image based on image data and stores the image in a prescribed frame memory, 22 a main frame memory which stores a part program execution screen and editing screen, 22a a reading unit for reading a main image out of the main frame memory 22 in synchronism with raster scanning of a CRT 26, 23 a subordinate frame memory which stores the part program execution screen that prevails when an error occurs, 23a a reading unit for reading a subordinate image out of the subordinate frame memory 23 in synchronism with raster scanning of the CRT 26, and 24 a mixing circuit for combining, and outputting to the CRT 26, the main image read out of the main frame memory 22 and the subordinate image read out of the subordinate frame memory 23. Numeral 25 designates a gate circuit which does not output the subordinate image read out of the subordinate frame memory 23 to the mixing circuit when a changeover signal GOT output by the display processor 21 is at a low level, but which does output the subordinate image to the mixing circuit 24 when the changeover signal GOT attains a high level. Numeral 27 denotes a display RAM, and 28 a timing signal generator circuit which generates a bit clock whose frequency conforms to the raster scanning velocity of the beam in the CRT 26, as well as a vertical synchronizing signal, a horizontal synchronizing signal, etc.

Figure 3:
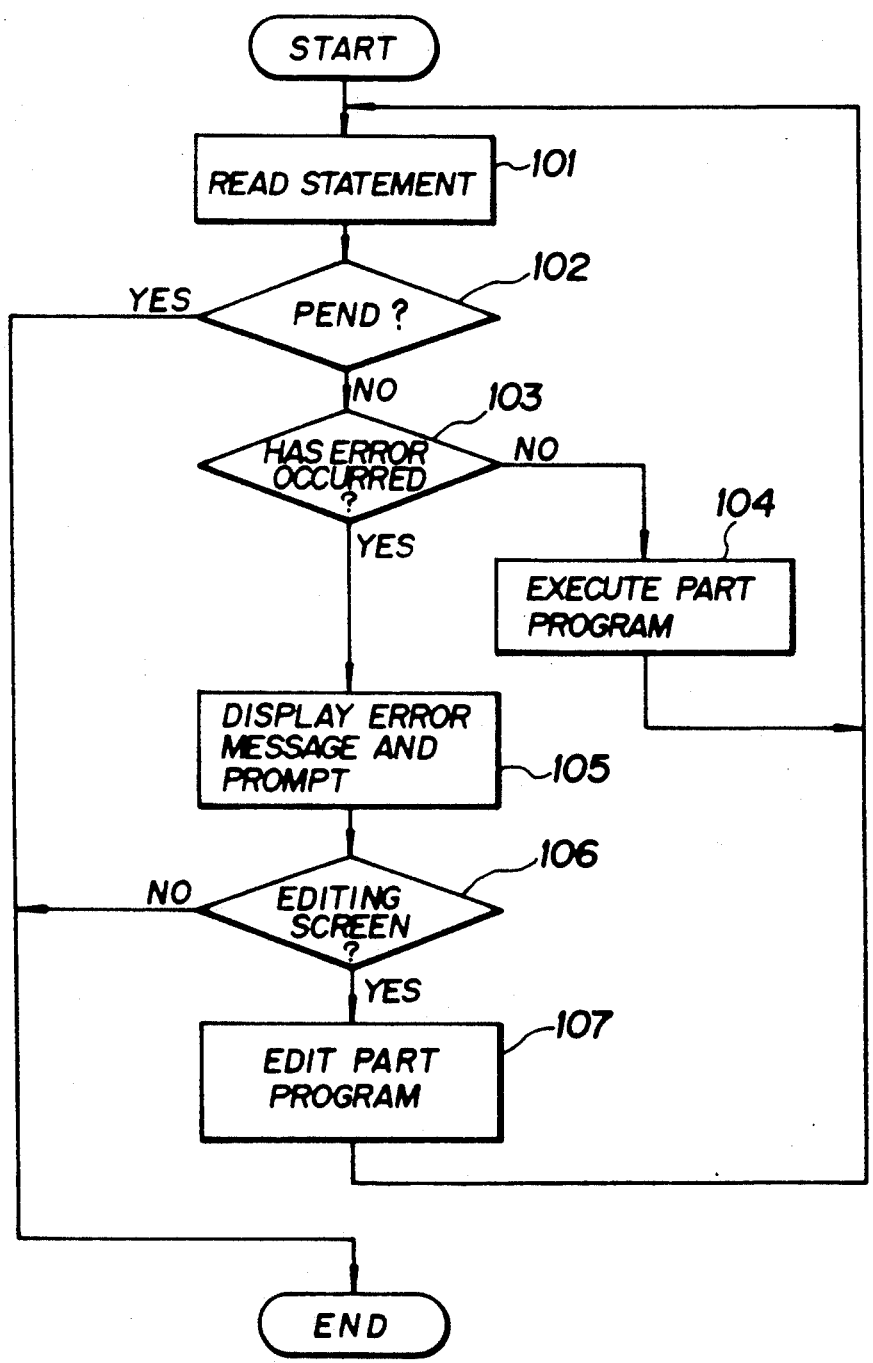
FIG. 3 is a flowchart of part program execution processing according to the invention.

FIG. 3 is a flowchart of processing for the part program execution method according to the present invention. Part program execution processing will now be described in accordance with the flowchart of FIG. 3. It is assumed here that the part program PPM has already been created and stored in the RAM 11c.

When the operator selects a part program execution activity by a prescribed operation using an initial screen, a dialog screen for part program execution is displayed on the CRT. More specifically, on the basis of the image data for the part program execution screen, the display processor 21 generates the part program execution screen, stores it in the main frame memory 22 and displays it on the CRT 26 via the reading unit 22a.

Figures 6, 7:
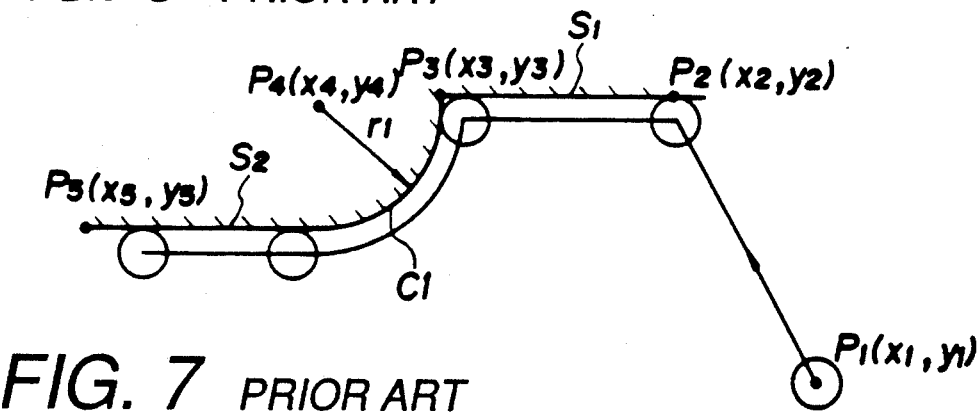

In this state, the completed part program (e.g., the part program PPM shown in FIG. 7) is designated and an execute key, not shown, is operated. When this is done, the processor 11a reads in an i-th (the initial value of i is 1) statement of the part program PPM (step 101) and determines whether this statement is the end PEND of the part program (step 102). If the statement is PEND, execution of the program is terminated. If the statement is not PEND, however, it is determined whether a grammatical error or an error due a logical contradiction in terms of use of the statement is present in the statement (step 103). If there is no error, processing for execution of the part program is performed. That is, if the statement read in is a figure definition statement, the figure is painted on the CRT 26. If the statement is a motion definition statement, a tool path is painted on the CRT. Further, the statement is converted into NC data in a format (an EIA code or ISO code) capable of being executed by an NC unit, the NC data are stored in the NC data memory 15, and thereafter processing is executed from step 101 onward (step 104).

If the decision rendered at step 103 is that an error is present, the processor 11a displays an error message corresponding to the contents of the error on the display screen CRT and displays also a prompt inquiring as to whether the part program PPM is to be corrected (edited) (step 105). By way of example, in the processing for executing the statement on line number "051" in FIG. 7, there is a case in which the point P5 is on the inner side of the circular arc C1 (see FIG. 1) so that a figure of a tangent line S2 passing through the point P5 and tangent to the circular arc C1 cannot be defined. In such case, the processor 11a displays the error message M1 and the prompt M2 shown in FIG. 1. In the error message M1, "Error No. 164" is an error number corresponding to the contents of an error in a case where a designated tangent line cannot be obtained. A correspondence table ENOT giving the correspondence between error contents and error numbers is stored in the RAM 11c in advance.

If, in response to the prompt, the operator does not perform a correction (editing), the operator enters "0" as by the keyboard 14a. If a correction is to be performed, the operator enters "1" (step 106). The processor 11a ends the part program execution processing if "0" is entered.

If "1" is entered, on the other hand, the dialog screen is changed over from the part program execution screen to the correction screen (editing screen), the list of the part program PPM is displayed on the correction screen (see FIG. 4), and the part program is rendered correctable. Specifically, the display processor 21 stores the execution screen prevailing at the occurrence of the error in the subordinate frame memory 23, generates the correction screen (which includes the part program list) based on correction data for the part program correction screen, stores the data in the main frame memory 22 and displays the data on the CRT 26 via the reading unit 22a. If desired, the line number in which the error has been detected can be displayed in a manner to distinguish it from other line numbers.

Figure 5:
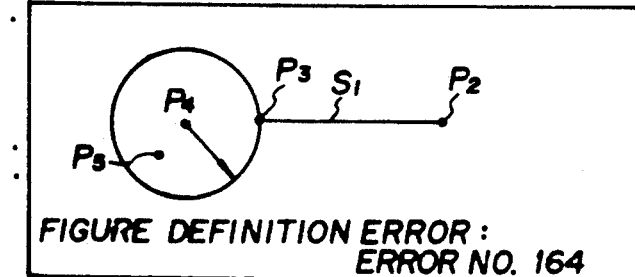
FIG. 5 shows an example of a dialog screen according to the invention.

In a case where it is desired to simultaneously display the execution screen (e.g., the screen of FIG. 1) prevailing at the occurrence of the error on the CRT 26 along with the list of the part program PPM, an "ERROR DISPLAY" key EFK (FIG. 1) provided on the keyboard 14a is pressed. When the "ERROR DISPLAY" key is pressed, the display processor 21 sets the changeover signal GOT to the high level and applies a read-out start/end timing to the reading unit 23a. As a result, the execution screen which prevailed at the occurrence of the error, and which has been stored in the subordinate frame memory 23, is read out by the reading unit 23a at the commanded timing, and the screen is input to the mixing circuit 24 via the gate circuit 25. Accordingly, the execution screen SIM (FIG. 5) prevailing at the occurrence of the error and the editing screen MIM read out of the main frame memory 22 are combined in the mixing circuit 24, and the result is displayed on the CRT 26. If the "ERROR DISPLAY" key EFK is pressed under these conditions, the changeover signal GOT assumes the low level and the execution screen prevailing at the occurrence of the error vanishes from the CRT 26.

The operator corrects the part program PPM while referring to the execution screen SIM prevailing at the occurrence of the error. By way of example, the coordinates of the point P5 are corrected to a position outside the circular arc C1 and an attempt is made to obtain the tangent line S2 (step 107).

When correction of the part program PPM is finished, the operator presses an edit end key, not shown. When this done, the processor 11a changes over the dialog screen from part program editing screen to the execution screen and re executes part program execution processing from step 101 onward starting from the beginning of the corrected part program PPM.

Thus, in accordance with the present invention, the arrangement is such that a prompt inquiring as to whether a part program is to be corrected is displayed when an error occurs during execution of the part program, a correction screen is displayed if implementation of a correction has been designated, and the part program is re-executed from the beginning thereof in response to the end of the correction. As a result, a key operation needed to change back and forth between an editing screen and an execution screen is eliminated, part program debugging time can be shortened and the labor required therefore reduced.

We claim:

1. A part program correcting method for correcting a part program when an error is detected during execution of the part program, wherein the part program is created in an automatic programming language and contains figure definition statements and motion definition statements, said method comprising the steps of:
   (a) executing the part program by converting the part program into NC data in a format capable of being executed by an NC unit and by displaying a figure defined by the figure definition statements and a tool path defined by the motion definition statements on a part program execution screen;
   (b) storing when the error is detected during execution of the part program the part program execution screen and displaying a prompt and a message describing contents of the error on the part program execution screen in which the prompt inquires whether a correction is to be made to the part program;
   (c) displaying a correction screen, with which the part program is capable of being corrected if implementation of the correction is requested in a request by a user in response to the prompt;
   (d) displaying the part program execution screen in superimposed form within the correction screen in response to the request; and
   (e) returning to the part program execution screen after the user has corrected the part program forming a corrected part program and after the user has indicated that the correction is finished, and re-executing the corrected part program from the beginning.

* * * * *